Patented July 4, 1950

2,514,198

UNITED STATES PATENT OFFICE 2,514,198

STABILIZATION

Louis I. Hansen, Minneapolis, Minn., and George E. P. Smith, Jr., Akron, Ohio, assignors to The Firestone Tire & Rubber Company, Akron, Ohio, a corporation of Ohio No Drawing. Application August 6, 1947, Serial No. 766,880

19 Claims. (Cl. 260—45.75)

This invention relates to the stabilization of rubber-like copolymers of a conjugated diene and a vinyl compound (or methyl-substituted vinyl compound, viz., alpha methylstyrene and methacrylonitrile). The vinyl compounds include, for example, styrene, alpha methylstyrene, nuclearly substituted styrenes, monochlorostyrene, dichlorostyrene, vinylnaphthalene, vinylbiphenyl, vinyl carbazole, 2-vinyl-5-ethylpyridine, 2 - ethyl - 5 - vinylpyridine, acrylonitrile, methacrylonitrile, etc. The conjugated dienes include, for example, 1,3-butadiene, isoprene, 2-cyanobutadiene-1,3, cyclopentadiene, piperylene, dimethylbutadiene-1,3, 2-methylpentadiene, etc. More particularly, the invention relates to the stabilization of such copolymers with stannous salts of catechol and alkylated catechols. Such stabilizers affect not only the uncured copolymers but also the vulcanizates. They have a beneficial effect on the coagulum obtained from emulsion copolymerization, during drying, storage, etc.

Various stabilizers have been used commercially with these rubber-like copolymers, and others have been suggested. Some discolor badly. The tests reported below show that not only are the stannous salts of catechol and alkylated catechols good stabilizers, but generally speaking, they are non-discoloring.

In the tests recorded below only certain catecholates are mentioned. The invention is not limited to the use of these but include stannous catecholates with hydrocarbon substituents having a total of zero to ten carbon atoms, including, for example, stannous catecholate, stannous p-methylcatecholate, stannous p-ethylcatecholate, stannous p-isopropylcatecholate, stannous p-n-propylcatecholate, stannous o-tert-butylcatecholate, stannous o-ethylcatecholate, stannous 4,6-dimethylcatecholate, stannous 4,5-dimethylcatecholate, stannous trimethylcatecholate, stannous tetramethylcatecholate, stannous di-tert-butylcatecholate, the stannous amylcatecholates, the stannous hexylcatecholates, the stannous heptylcatecholates, the stannous octylcatecholates, the stannous nonylcatecholates, the stannous decylcatecholates, the stannous di-amyl-catecholates, etc.

The compound referred to herein at catechol is o-dihydroxybenzene. It is sometimes called pyrocatechin. The stannous compounds are referred to herein as salts because it is believed that they are true neutral salts. They may be hydrated or they may be basic salts. They may even be Werner coordinated chelate compounds. One reason for believing that they are salts and not chelates is that they may be formed by different methods. The following examples are illustrative.

EXAMPLE 1

Seven and five-tenths kilograms of catechol (68 moles) were dissolved in 23 liters of water; 13 kilograms of stannous chloride (68 moles) were added to the catechol solution. Five and five-tenths kilograms of sodium hydroxide (137 moles) were dissolved in 16 liters of water and run slowly into the first solution with stirring and cooling to a temperature of 40–42° C. The product was filtered with suction, washed with water, and oven dried. Yield 15.4 kilograms.

*Analysis.*—Calc. for $C_6H_4O_2Sn$: Sn, 52.34 per cent. Found, 51.20 per cent (microgravimetric).

EXAMPLE 2

Ten grams of catechol (0.091 mole) were dissolved in an aqueous solution of 7.3 grams of sodium hydroxide (0.182 mole). Seventeen and three-tenths grams of stannous chloride (0.091 mole) were dissolved in water and added to the first solution. The resulting slurry was acidified with acetic acid and the product filtered off and dried. Yield 20.3 grams.

*Analysis.*—Calc. for $C_6H_4O_2Sn$: Sn, 52.34 per cent. Found, 51.75 per cent (microgravimetric).

Although the stabilizer may be added at any stage of the process of preparing or compounding or otherwise treating the copolymer, it is advantageously added to the latex and is thus incorporated in the coagulum obtained from the latex resulting from emulsion copolymerization of the monomers and consequently is effective as an antioxidant during drying as well as thereafter. In each of the recorded experiments the stabilizer was added to the latex in a sodium oleate emulsion. The results of the experiments show that stannous catecholate and stannous alkyl-substituted catecholates are superior to stabilizers used commercially and identified herein as Stabilizer Nos. 1, 2 and 3.

STABILIZATION OF GR-S

Untreated rubber-like copolymer of 1,3-butadiene and styrene (known commercially as GR-S) is lacking in anti-oxidants such as occur in natural rubber and ages under conditions which have little effect on natural rubber. It is, therefore, desirable to add stabilizer to the latex in order to stabilize the copolymer during drying, storage, etc.

The following table records the results of tests conducted on different portions of the same latex, treated with different amounts of two of the stabilizers of this invention and of the commercial stabilizer identified herein as Stabilizer 1. No blank void of stabilizer was used in the tests because it is well known that the copolymer loses all or substantially all of its rubber-like properties under the conditions of the test. The samples were dried for 20 hours at 75° C. The results of drying are illustrative of what happens on drying at any elevated temperature. The dried coagula were then aged in a circulating-air oven at 90° C. for two days and four days. Other samples were aged for one day at 120° C. The following table records changes in color which took place and changes in the physical properties of the copolymer as determined by a hand test which involved feeling and stretching the stock to see to what extent, if any, it had deteriorated.

TABLE I

Drying and aging of copolymer

| | Stabilizer | | | | | |
|---|---|---|---|---|---|---|
| | Stannous Catecholate | | p-tert-Butyl-Catecholate | | Stabilizer No. 1 | |
| | 1% | 2% | 1% | 2% | 1% | 2% |
| After drying 20 Hrs. at 75° C.: | | | | | | |
| Color | White | White | Light cream | Cream | Brown | Brown. |
| Hand Test | No change | No change | No change | No change | No change | No change. |
| Aged at 90° C.: | | | | | | |
| Two days— | | | | | | |
| Color | Light cream | Light cream | Cream | Very light brown | Brown | Brown. |
| Hand Test | No change | No change | No change | No change | No change | No change. |
| Four days— | | | | | | |
| Color | Cream | Very light brown | Very light brown | Very light brown | Brown | Brown. |
| Hand Test | No change | No change | No change | No change | No change | No change. |
| Aged one day at 120° C.: Hand Test | Slightly set up | do | Somewhat set up | Slightly set up | Somewhat set up | Somewhat set up. |

The last test is very drastic. It developed color in even the best stabilizers, but the test stabilizers were better than the commercial stabilizer.

The tests recorded in the first table show excellent copolymer color on drying and resistance to discoloration on aging when stannous catecholate is used as the stabilizer or antioxidant. The stannous alkyl-substituted catecholate, likewise, gives results superior to the commercial stabilizer although the results with the stannous catecholate are better. The fact that superior plasticity retention is imparted to the copolymer is particularly worthy of note because nondiscoloring antioxidants are usually inferior in this respect in synthetic rubbers to the better discoloring antioxidants, such as Stabilizer No. 1.

To further study the effect of stannous catecholate on plasticity, certain tests were conducted in a Mooney plastometer using the large rotor and conducting the test for 4 minutes at 212° F. As controls, Stabilizer No. 1 and another widely used commercial stabilizer, herein identified as Stabilizer No. 2, are employed. The figure in the following table in each case represents the Mooney plasticity.

TABLE II

Drying and aging of copolymer

| Antioxidant | After Drying 20 Hrs. at 75° C. | | | After Aging 4 Days at 90° C. | | After Aging 4 Days at 90° C. and Then 4 Days at 110° C. | |
|---|---|---|---|---|---|---|---|
| | ML-4/212 | Color | Hand Test | ML-4/212 | Hand Test | ML-4/212 | Hand Test |
| 2% Stannous Catecholate | 51 | White | No change | 37 | No change | 44 | No change. |
| 2% Stabilizer No. 2 | 44 | Medium dark gray-brown | do | 36 | do | 84 | Set up. |
| 2% Stabilizer No. 1 | 47 | Brown | do | 36 | do | 76 | Somewhat set up. |

The results (and particularly those in the last column obtained under very drastic test conditions) show the Mooney value of the copolymer containing 2 percent stannous catecholate to be actually less than the original Mooney plasticity, which was 51. Both commercial stabilizers permitted considerable stiffening as shown both by the Mooney plasticities and the results of hand tests.

Tests were conducted on the vulcanizate using differently compounded materials for comparison.

The first formula used, in which all parts are by weight, follows:

FORMULA 1

| | |
|---|---|
| Copolymer containing 2% stabilizer | 100.00 |
| Neutral coal tar distillate | 3.00 |
| Pine tar | 3.00 |
| Stearic acid | 3.00 |
| Zinc oxide | 5.00 |
| Accelerator | 1.20 |
| Channel black | 50.00 |
| Sulfur | 2.00 |

The stocks were cured 40 minutes, 60 minutes, 80 minutes, and 120 minutes, respectively, at 280° F. and then aged four days in an oven at 212° F. The tests recorded in the following table are an average of the results obtained with the different cures.

TABLE III

Aging of vulcanizate

| Stabilizer | 300 per cent Modulus | | Tensile strength | | | Per cent Elongation at Break | | |
|---|---|---|---|---|---|---|---|---|
| | Normal | Aged | Normal | Aged | Per cent of Normal | Normal | Aged | Per cent of Normal |
| Stannous catecholate | 785 | 2,100 | 2,680 | 2,780 | 103.8 | 665 | 370 | 55.7 |
| Stabilizer No. 1 | 860 | 2,195 | 2,900 | 2,580 | 89.0 | 645 | 335 | 51.9 |

(The modulus and tensile figures in all of the tables herein represent pounds per square inch.)

Other stocks compounded according to the above formula and cured 80 minutes at 280° F. were tested for hot elongation at 100° C. and 200° C. both before and after aging five days at 212° C. The results of the tests are given in the following table:

TABLE IV

Per cent hot elongation

| Stabilizer | Unaged Stock | | Aged Stock | |
|---|---|---|---|---|
| | 100° C. | 200° C. | 100° C. | 200° C. |
| Stannous catecholate | 695 | 425 | 260 | 180 |
| Stabilizer No. 1 | 565 | 360 | 215 | 170 |

Tables III and IV show that the stannous catecholate is superior to the commercial stabilizer in that it gives better percentage retention of tensile strength and elongation on aging, and it gives a stock having a higher normal and higher aged hot elongation. In addition to imparting these superior properties to the vulcanized rubber, the stannous catecholate does not discolor the copolymer during vulcanization or during aging of the vulcanizate. (See Tables VI and VII.)

For the next test the stannous catecholate was compounded with ingredients to produce a white stock, and the properties of the vulcanizate were compared with stock identically compounded in which Stabilizer No. 2 was substituted for the stannous catecholate. The compounding formula follows:

FORMULA 2

| | |
|---|---|
| Copolymer containing 2% stabilizer | 100.00 |
| Coumarone resin | 10.00 |
| Wax | 2.00 |
| Accelerator | 1.10 |
| Magnesium oxide | 8.00 |
| Zinc oxide | 100.00 |
| Ultramarine blue | 0.10 |
| Titanium oxide | 30.00 |
| Sulfur | 4.00 |

The stocks were cured 30, 50 and 70 minutes, respectively, at 290° F. and then aged for four days in an oven at 212° F. The physical properties of the stocks subjected to different cures were averaged and are recorded in the following table.

TABLE V

Physical properties of vulcanizate

| Stabilizer | 200 Per cent Modulus | | Tensile Strength | | | Per cent Elongation at Break | | |
|---|---|---|---|---|---|---|---|---|
| | Normal | Aged | Normal | Aged | Per cent Normal | Normal | Aged | Per cent Normal |
| Stannous catecholate | 415 | 710 | 1,135 | 1,440 | 127.0 | 495 | 405 | 81.9 |
| Stabilizer No. 2 | 385 | 665 | 1,110 | 1,050 | 94.5 | 510 | 375 | 73.5 |

The results recorded in the above table show that the stannous catecholate imparted to the vulcanizate better retention of tensile and elongation on aging than a widely used nondiscoloring commercial stabilizer. The tests reported in the following tables show that of the above stocks compounded with stannous catecholate and this Stabilizer No. 2, the test stock was superior from the standpoint of resistance to discoloration. The tests were conducted on stocks cured 50 minutes at 290° F.

TABLE VI

Artificial exposure test

| Stabilizer | Fadeometer at 125° F. | | Sunlamp | |
|---|---|---|---|---|
| | 5 Hours | 10 Hours | 8 Hours | 16 Hours |
| Stannous catecholate | White | White | White | White. |
| Stabilizer No. 2 | Dark cream | Light brown | Tan | Light brown. |

TABLE VII

*Exposure to natural weathering*

| Stabilizer | 2 Months in Florida | 2 Months in Florida+2 Months in Ohio |
|---|---|---|
| Stannous catecholate | White | White. |
| Stabilizer No. 2 | Slightly creamy | Tan. |

The natural weathering test was conducted on tapered dumbbell strips stretched 12½ percent. The Florida exposure started in February in both instances, and the Ohio exposure in May.

Several other stannous alkylcatecholates were tested as stabilizers by adding 2 percent of each to the latex resulting from copolymerization of 1,3-butadiene and styrene, with the results recorded below. The latex was coagulated and dried for 20 hours at 75° C. The dried coagula were then aged at 110° C. in a recirculating oven. Change in color was noted and the amount of deterioration was determined by feeling and pulling. Stabilizer No. 2 was used as a control. A blank containing no stabilizer was included for comparison.

TABLE VIII

*Copolymer drying and aging*

| Stabilizer | After Drying | After Aging at 110° C. | | |
|---|---|---|---|---|
| | | 1 Day | 2 Days | 4 Days |
| Stannous 4,5-dimethyl-catecholate: | | | | |
|   Color | White | Dark cream | Med. light brown | Gray brown. |
|   Hand Test | No change | No change | No change | No change. |
| Stannous heptyl-catecholate: | | | | |
|   Color | Very light pink | Cream color | Dark cream | Med. gray brown. |
|   Hand Test | No change | No change | No change | No change. |
| Stabilizer No. 2: | | | | |
|   Color | Dark gray | Gray brown | Gray brown | Gray brown. |
|   Hand Test | No change | No change | No change | Somewhat set up. |
| Blank: | | | | |
|   Color | Very light gray | Light brown | | |
|   Hand Test | No change | Portion somewhat hardened but rest unchanged. | Somewhat hardened. | Somewhat hardened. |

Tests on the drying and aging of copolymer containing other stabilizers is recorded in the following table:

TABLE IX

*Drying and aging copolymer*

| Stabilizer | After drying 20 hrs. at 75° C. | | Aging at 110° C. | | | |
|---|---|---|---|---|---|---|
| | | | 2 days | | 4 days | |
| | Color | Hand test | Color | Hand test | Color | Hand test |
| Stannous amyl methylcatecholate | Cream | No change | Light brown | No change | Light brown | No change. |
| Stannous diamylcatecholate | Light yellow | do | do | do | do | Do. |
| None | Light brown | do | | (¹) | | Somewhat hardened. |

¹ Resinous in spots and the rest set up.

Stocks containing other stabilizers were similarly tested with the following results:

TABLE X

*Drying and aging of copolymer*

| Stabilizer | After drying 20 hrs. at 75° C. | | Hand test after aging | |
|---|---|---|---|---|
| | Color | Hand Test | 2 days | 4 days |
| Stannous di(tert-butyl)-catecholate | Light yellow | No change | Slightly set up | Surface shiny, set up. |
| Stannous, methyl, tert-butyl-catecholate | Light green gray | do | No change | Somewhat set up. |
| Stannous, heptyl-catecholate | Very light pink | do | do | No change. |
| None | Very light gray | do | Somewhat hardened | Somewhat hardened. |

Copolymer coagula containing 2 percent of several of the above stabilizers were compounded in Formula 2 using as a control Stabilizer No. 2. Tables XI, XII and XIII record the physical properties of such stocks before and after oven aging 4 days at 212° F.

The reports of several natural and artificial weathering tests on stocks heavily loaded with zinc oxide are given. Each stock contained 2 percent of stabilizer added to the latex. The controls include a commercial stabilizer herein iden-

TABLE XI

*Physical properties of vulcanizate*

| Stabilizer | Stannous 4-methyl catecholate | Stannous 4,5-dimethyl-catecholate | Stannous 4,6-dimethyl-catecholate | Stannous heptyl catecholate | Stabilizer No. 2 | Stabilizer No. 3 |
|---|---|---|---|---|---|---|
| 300 percent Modulus: | | | | | | |
| Unaged | 250 | 200 | 275 | 225 | 325 | 325 |
| Aged | 675 | 625 | 750 | 650 | 875 | 750 |
| Tensile strength: | | | | | | |
| Unaged | 1,475 | 1,075 | 1,400 | 1,200 | 1,250 | 1,250 |
| Aged | 1,475 | 1,400 | 1,450 | 1,300 | 1,475 | 1,550 |
| Percent elongation at break: | | | | | | |
| Unaged | 610 | 580 | 580 | 540 | 480 | 480 |
| Aged | 425 | 420 | 420 | 400 | 395 | 410 |

TABLE XII

*Physical properties of vulcanizate*

| Stabilizer | 300% Modulus | | | Tensile strength | | Per Cent Elongation at break | | |
|---|---|---|---|---|---|---|---|---|
| | Un-aged | Aged | Per Cent Increase | Un-aged | Aged | Un-aged | Aged | Per Cent Retention |
| Stannous di(tert-butyl)catecholate | 90 | 225 | 135 | 820 | 1,015 | 690 | 530 | 76.8 |
| Stannous methyl, tert-butyl-catecholate | 90 | 315 | 225 | 1,060 | 1,160 | 715 | 475 | 65.5 |
| Stabilizer No. 2 | 205 | 530 | 325 | 825 | 975 | 475 | 375 | 78.9 |

TABLE XIII

*Physical properties of vulcanizate*

| Stabilizer | 300% Modulus | | Tensile strength | | Per Cent Elongation at break | | |
|---|---|---|---|---|---|---|---|
| | Un-aged | Aged | Un-aged | Aged | Un-aged | Aged | Per Cent Retention |
| Stannous heptyl-catecholate | 230 | 660 | 1,260 | 1,290 | 535 | 400 | 75.0 |
| Stabilizer No. 2 | 325 | 865 | 1,260 | 1,475 | 480 | 390 | 81.4 |

The physical properties of the stocks stabilized with the stannous alkylcatecholates as recorded in the above tables compare favorably with the stocks containing the commercial stabilizers.

tified as Stabilizer No. 3. The tests of Tables XIV and XV record the results of weathering in Akron, Ohio.

TABLE XIV

*Natural weathering*

| Stabilizer | 8 days, color | 2 Months | | |
|---|---|---|---|---|
| | | Color | | Checking |
| | | Front | Back | |
| Stannous di(tert-butyl)-catecholate | No change | No change | No change | |
| Stannous methyl, tert-butyl-catecholate | do | do | do | Slight. |
| Stabilizer No. 2 | Dark cream | Light tan | Light tan | Do. |
| Stabilizer No. 3 | No change | No change | No change | Do. |

TABLE XV

Natural weathering

| Stabilizer | 8 Days, Color | 1 Month | | |
|---|---|---|---|---|
| | | Color | | Checking |
| | | Front | Back | |
| Stannous 4-methyl-catecholate | No change | No change | No change | None. |
| Stannous 4,5-dimethyl-catecholate | do | do | do | Do. |
| Stannous 4,6-dimethyl-catecholate | do | do | do | Do. |
| Stannous heptyl-catecholate | do | do | do | Do. |
| Stabilizer No. 2 | Dark cream | Light tan | Light tan | Do. |
| Stabilizer No. 3 | No change | No change | No change | Do. |

TABLE XVI

Natural weathering

| Stabilizer | Color After One Month's Exposure |
|---|---|
| Stannous di(tert-butyl)-catecholate | No change. |
| Stannous methyl, tert-butylcatecholate | Do. |
| Stannous heptylcatecholate | Do. |
| Stabilizer No. 2 | Light tan. |

Artificial weathering tests were conducted by exposure for different lengths of time in a fadeometer and by exposure to a sunlap at 7 inches' distance. Each stock contained 2 percent of stabilizer (based on the copolymer). The condition of the stocks immediately after exposure is reported in columns "A" and the condition of the same stocks 2 months after exposure is reported in columns "B."

TABLE XVII

Artificial weathering

| Stabilizer | Fadeometer at 125° F. | | | | Sun lamp at 7 inches | | | |
|---|---|---|---|---|---|---|---|---|
| | 5 Hours | | 10 Hours | | 8 Hours | | 16 Hours | |
| | A | B | A | B | A | B | A | B |
| Stannous 4-methyl catecholate | Bleached | Slightly discolored | Slightly discolored | Light cream | Very sl. discolored | Light cream | Sl. discolored | Light cream. |
| Stannous 4,5-dimethyl-catecholate | do | do | do | do | do | do | do | Do. |
| Stannous 4,6-dimethyl-catecholate | Very slightly discolored | Light cream | do | Cream | do | do | do | Cream. |
| Stannous heptyl-catecholate | Bleached | do | Very sl. discolored | do | do | do | do | Do. |
| Stabilizer No. 2 | Light tan | Tan | Tan | Light brown | Tan | Light tan | Tan | Tan. |
| Stabilizer No. 3 | Bleached | Light cream | Bleached | Light cream | Sl. discolored | Light cream | Light tan | Light tan. |

The results of other weathering tests are recorded in the following tables:

TABLE XVIII

Artificial weathering

| Stabilizer | 10 Hrs. in Fadeometer at 125° F. | 16 Hrs. in Sun lamp at 7 inches |
|---|---|---|
| Stannous di(tert-butyl)-catecholate | Cream | Light tan. |
| Stannous methyl, tert-butyl-catecholate | do | Do. |
| Stabilizer No. 2 | Light brown | Dark tan. |

TABLE XIX

Artificial weathering

| Stabilizer | 10 Hrs. in Fadeometer at 125° F. | 16 Hrs. in Sun lamp at 7 inches |
|---|---|---|
| Stannous heptylcatecholate | Very slightly discolored | Slightly discolored. |
| Stabilizer No. 2 | Tan | Tan. |

The weathering tests show the stannous alkylcatecholates to be superior to the commercial stabilizers used in the tests.

Thus, the stabilizers of this invention are effective in rubber-like copolymers of a conjugated diene and a vinyl aromatic compound, before and after aging, and in general may be said to be nondiscoloring.

STABILIZATION OF COPOLYMERS OF BUTADIENE AND ACRYLONITRILE

The stabilizers of this invention may be used in rubber-like copolymers of 1,3-butadiene and acrylonitrile or a homologue such as methacrylonitrile, for example. The following tests were made with different stabilizers in copolymers of different composition. Two percent of the different stabilizers (based on the weight of the copolymer) were added to latex resulting from emulsion copolymerization of the monomers. The stabilizers were added as sodium oleate emulsions. Certain of the tests recorded below involve comparison with a blank which contained no stabilizer, but to which sodium oleate was added.

Each latex was coagulated and the coagulum dried 20 hours at 75° C. The coagula were aged in an oven for four days at 90° C. The following tables record the results of tests on different copolymers, that of Table XX containing 36% acrylonitrile and that of Table XXI containing 30 percent.

TABLE XX

*Copolymer drying and aging*

| Stabilizer | Color after Drying | After Aging | |
|---|---|---|---|
| | | Color | Hand Test |
| Stannous catecholate | Light gray | Tan | Very good. |
| Stabilizer No. 1 | Brown | Dark brown | Excellent. |
| None | Light tan | Dirty brown | Poor. |

TABLE XXI

*Copolymer drying and aging*

| Stabilizer | Color after Drying | After Aging | |
|---|---|---|---|
| | | Color | Hand Test |
| Stannous catecholate | Light tan | Tan | Very good. |
| Stabilizer No. 1 | Light brown | Brown | Do. |

In Table XXII an alkylated catechol salt is used in copolymer of 36% acrylonitrile content:

TABLE XXII

*Copolymer drying and aging*

| Stabilizer | Color After Drying | After Aging | |
|---|---|---|---|
| | | Color | Hand Test |
| Stannous tert-butyl-catecholate | Tan | Brown | Excellent. |
| Stabilizer No. 1 | Light brown | Dark brown | Do. |
| None | Light tan | Dirty brown | Poor. |

In the following table a copolymer containing 30 percent acrylonitrile was used.

TABLE XXIII

*Copolymer drying and aging*

| Stabilizer | Color After Drying | After Aging | |
|---|---|---|---|
| | | Color | Hand Test |
| Stannous tert-butyl-catecholate | Light tan | Gray tan | Good. |
| Stabilizer No. 1 | Light brown | Brown | Do. |

The stabilizers of this invention, therefore, compare favorably with the commercial stabilizer in their effect on the copolymers. They are relatively nondiscoloring.

Stocks were compounded with different stabilizers according to the following formula:

FORMULA 3

| | |
|---|---|
| Copolymer containing 2% stabilizer | 100.00 |
| Coumarone resin | 7.50 |
| Sulfur | 1.00 |
| Magnesium oxide | 5.00 |
| Zinc oxide | 85.00 |
| Neutral clay | 20.00 |
| Titanium dioxide | 20.00 |
| Accelerator | 1.30 |

The copolymer used contained 36 percent acrylonitrile. The stocks were cured 40 minutes at 280° F. They were subjected to aging in natural and artificial light. For aging in natural light tapered strips were elongated 15 percent and exposed to Florida sunlight and weather for two months. Stock containing stannous catecholate remained white, whereas that containing Stabilizer No. 1 became gray brown.

The artificial weathering tests were conducted by exposing strips of white vulcanizate for ten hours in a fadeometer at 125° F., and by exposing other strips to a sunlamp for sixteen hours at a distance of 7 inches. The results are recorded in Tables XXIV and XXV.

TABLE XXIV

*Artificial weathering*

| Stabilizer | Fadeometer at 125° F. | Sun lamp at 7 inches |
|---|---|---|
| Stannous catecholate | Cream | Light cream. |
| Stabilizer No. 1 | Brown | Gray brown. |
| None | Light cream | Light cream. |

TABLE XXV

*Artificial weathering*

| Stabilizer | Fadeometer at 125° F. | Sun lamp at 7 inches |
|---|---|---|
| Stannous 4-tert-butylcatecholate | Cream | Light cream. |
| Stabilizer No. 1 | Brown | Gray brown. |
| None | Light cream | Light cream. |

The stabilizers of this invention are shown by the above tests to be relatively nondiscoloring.

Copolymer containing 30 percent acrylonitrile was treated with 2 percent of stabilizers before coagulation and the coagula compounded as follows:

FORMULA 4

| | |
|---|---|
| Copolymer containing 2% stabilizer | 100.00 |
| Sulfur | 2.00 |
| Carbon black | 50.00 |
| Stearic acid | 3.50 |
| Zinc oxide | 5.00 |
| Accelerator | 1.30 |

The stocks were cured 60 minutes at 274° F. and then aged in an oven for four days at 212° F. and also aged in an air bomb (60 lb. air) for ten hours at 260° F. The stocks were then tested and their properties recorded in the following table:

TABLE XXVI

*Physical properties of vulcanizate*

| Stabilizer | Stannous catecholate | Stabilizer No. 1 |
|---|---|---|
| Before Aging: | | |
| Modulus at 300% | 1,925 | 2,175 |
| Tensile strength | 3,075 | 3,050 |
| Per cent Elongation at break | 450 | 400 |
| After Oven-Aging: | | |
| Tensile strength | 2,500 | 2,775 |
| Per cent Elongation at break | 210 | 200 |
| After Air-Bomb Aging: | | |
| Tensile strength | 2,450 | 2,725 |
| Per cent Elongation at break | 230 | 220 |

Thus, the stabilizers of this invention are shown to compare favorably with the commercial stabilizer in both the uncured and the cured copolymer. They are relatively nondiscoloring.

Usually, about 1.0 to 5 percent of the stabilizer, will be used with any of the copolymers included herein. The stabilizer may be used in smaller amount with another stabilizer. Generally speaking, from 0.1 to 10.0 percent of the stabilizer may be used, based on the weight of the copolymer. The examples are illustrative. The invention is defined in the appended claims.

The stannous alkyl catecholates are claimed as new compounds in Smith application Serial No. 43,529, filed August 10, 1948. The preparation of stannous catecholates by making alkaline a solution of a catechol and a stannous salt of a mineral acid is claimed in Smith Serial No. 28,728, filed May 22, 1948.

What we claim is:

1. A rubber-like composition which is essentially copolymer of (1) a conjugated diene from the class consisting of 1,3-butadiene, isoprene, 2-cyanobutadiene-1,3, cyclopentadiene, piperylene, dimethylbutadiene-1,3 and 2-methylpentadiene, and (2) a compound of the class consisting of styrene, alpha methylstyrene, nuclearly substituted styrenes, vinylnaphthalene, vinylbiphenyl, vinyl carbazole, 2-vinyl-5-ethylpyridine, 2-ethyl-5-vinylpyridine, acrylonitrile and methacrylonitrile, which copolymer is stabilized by a small amount of a stannous salt of the class consisting of the catecholate and those alkylcatecholates in which the total of the carbons in the alkyl groups is one to ten.

2. Cured rubber-like copolymer of 1,3-butadiene and styrene stabilized with a small amount of stannous catecholate.

3. Cured rubber-like copolymer of 1,3-butadiene and styrene stabilized with a small amount of a stannous alkylcatecholate in which the total of the carbons in the alkyl groups is one to ten.

4. Cured rubber-like copolymer of 1,3-butadiene and acrylonitrile stabilized with a small amount of stannous catecholate.

5. Cured rubber-like copolymer of 1,3-butadiene and acrylonitrile stabilized with a small amount of a stannous alkylcatecholate in which the total of the carbons in the alkyl groups is one to ten.

6. Uncured rubber-like copolymer of 1,3-butadiene and styrene stabilized with a small amount of a stannous salt of the class consisting of the catecholate and those alkylcatecholates in which the total of the carbons in the alkyl groups is one to ten.

7. Uncured rubber-like copolymer of 1,3-butadiene and acrylonitrile stabilized with a small amount of a stannous salt of the class consisting of the catecholate and those alkylcatecholates in which the total of the carbons in the alkyl groups is one to ten.

8. Nondiscoloring rubber-like composition composed essentially of copolymer of a conjugated diene monomer and a vinyl aromatic compound stabilized with a small amount of a stannous salt of the class consisting of the catecholate and those alkylcatecholates in which the total of the carbons in the alkyl groups is one to ten.

9. Nondiscoloring rubber-like composition composed essentially of copolymer of a conjugated diene monomer and a monomer of the class consisting of acrylonitrile and homologues thereof, which copolymer is stabilized with a small amount of a stannous salt of the class consisting of the catecholate and those alkylcatecholates in which the total of the carbons in the alkyl groups is one to ten.

10. The process of stabilizing a rubber-like copolymer of a conjugated diene and a vinyl monomer, which comprises mixing therewith a small amount of a stannous salt of the class consisting of the catecholate and those alkylcatecholates in which the carbons in the alkyl groups total one to ten.

11. The process of producing rubber-like coagulum which comprises mixing a small amount of stannous catecholate with latex of a rubber-like copolymer of a conjugated diene monomer and styrene, coagulating and drying at an elevated temperature.

12. The process of producing rubber-like coagulum which comprises mixing with latex of a rubber-like copolymer of a conjugated diene monomer and styrene, a small amount of a stannous alkylcatecholate in which the total of the carbons in the alkyl groups is one to ten, coagulating and drying at an elevated temperature.

13. The process of producing rubber-like coagulum which comprises mixing a small amount of stannous catecholate with latex of a rubber-like copolymer of a conjugated diene monomer and acrylonitrile, coagulating and drying at an elevated temperature.

14. The process of producing rubber-like coagulum which comprises mixing with latex of a rubber-like copolymer of a conjugated diene monomer and acrylonitrile, a small amount of a stannous alkylcatecholate in which the total of the carbons in the alkyl groups is one to ten, coagulating and drying at an elevated temperature.

15. The process of curing rubber-like copolymer of 1,3-butadiene and styrene which comprises heating the same with sulfur and as a stabilizer a small amount of stannous catecholate.

16. The process of curing rubber-like copolymer of 1,3-butadiene and styrene which comprises heating the same with sulfur and as stabilizer a small amount of a stannous alkylcatecholate in which the total of the carbons in the alkyl groups is one to ten.

17. The process of curing rubber-like copolymer of 1,3-butadiene and acrylonitrile which comprises heating the same with sulfur and as stabilizer a small amount of stannous catecholate.

18. The process of curing rubber-like copolymer of 1,3-butadiene and acrylonitrile which comprises heating the same with sulfur and as stabilizer a small amount of a stannous alkylcatecholate in which the total of the carbons in the alkyl groups is one to ten.

19. The process of curing rubber-like copolymer of (1) a conjugated diene from the class consisting of 1,3-butadiene, isoprene, 2-cyanobutadiene-1,3, cyclopentadiene, piperylene, dimethylbutadiene-1,3 and 2-methylpentadiene, and (2) a compound of the class consisting of styrene, alpha methylstyrene, nuclearly substituted styrenes, vinylnaphthalene, vinylbiphenyl, vinyl carbazole, 2-vinyl-5-ethylpyridine, 2-ethyl-5-vinylpyridine, acrylonitrile and methacrylonitrile, which comprises heating the same heavily loaded with white pigment in a mixture with sulfur and a small amount of a stannous salt of the class consisting of the catecholate and those alkylcatecholates in which the total of the carbons in the alkyl groups is one to ten.

LOUIS I. HANSEN.
GEORGE E. P. SMITH, Jr.

REFERENCES CITED

The following references are of record in the file of this patent:

UNITED STATES PATENTS

| Number | Name | Date |
|---|---|---|
| 2,310,449 | Lightbown | Feb. 9, 1943 |
| 2,335,089 | Sibley | Nov. 23, 1943 |

FOREIGN PATENTS

| Number | Country | Date |
|---|---|---|
| 526,072 | Great Britain | Sept. 10, 1940 |